United States Patent Office 3,465,738
Patented Sept. 9, 1969

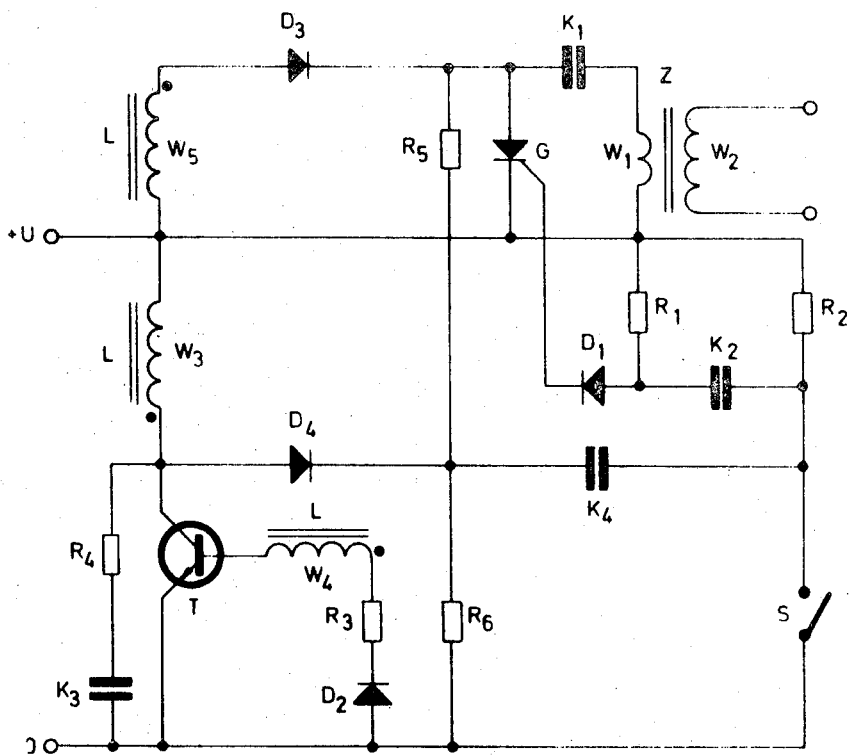

3,465,738
ELECTRONIC IGNITION CIRCUIT FOR MOTOR VEHICLES
Albrecht Gerlach, Emmendingen, and Manfred Habicht and Edgar Richter, Freiburg, Germany, assignors to International Standard Electric Corporation, New York, N.Y., a corporation of Delaware
Filed Oct. 27, 1967, Ser. No. 678,580
Claims priority, application Germany, Nov. 4, 1966, D 51,471
Int. Cl. F02p 1/00
U.S. Cl. 123—148                                    4 Claims

ABSTRACT OF THE DISCLOSURE

The invention relates to an electronic circuit for providing the ignition energy for an internal combustion engine. An ignition condenser, an electronic switch, and the primary winding of the ignition coil are connected in series. The condenser stores energy which is then used as a source of ignition pulses. A separate pulse generator recharges this condenser after each discharge caused by an ignition. The pulse generator is triggered by a voltage spike appearing in the circuit after each ignition.

---

This invention relates to circuits for generating fast rising voltage pulses, and more particularly to ignition circuits for autos.

Generally speaking, there are two ways of storing energy which may be used in an electronic auto ignition system. Thus, coils may be used for an intermediate store of magnetic energy; or, a condenser may serve as an intermediate storage of a voltage charge. Usually, a condenser provides a quick rise of voltage which makes the system insensitive to any shunts at the spark plug. But, the condensers have a disadvantage, as compared to the above mentioned advantage, since a charging device must be provided for the condenser in addition to the usual ignition transformer, assuming that the condenser is supplied from a motor-car battery, as is conventional. To provide this additional charging device, a push-pull voltage converter has been used.

In this mode of operation, the charging voltage of some 100 v. is generated constantly by the push-pull converter. Therefore, the converter must be designed so that it can provide the energy required at the maximum r.p.m. At a low r.p.m., the converter operates with only a partial load. Thus, the converter tends to be rather expensive. If, to avoid the expense, the converter is not provided with a high reserve of energy, either its output voltage or the voltage to which the condenser is charged drops as the pulse repetition rate increases with the sequence of the ignitions (r.p.m. of the motor). This is a great disadvantage since a higher ignition voltage is required or desirable at the spark plug at the maximum motor r.p.m. when the motor cylinder achieves a maximum compression.

Another disadvantage of this mode of operation is that motor speed may vary. Thus, if there is a fluctuation by an integer-numbered ratio, the voltage converter operating frequency may change the ignition frequency. The fluctuations in the ignition voltage have a frequency which is equal to the difference between the operating frequency of the voltage converter and the ignition frequency. Under certain circumstances, there may be a pulling effect wherein the voltage converter is triggered by the ignition process, instead of the other way around.

The invention relates to a circuit arrangement for a cendenser-type ignition system used in combination with combustion motors and the like. The above mentioned disadvantages are avoided with the aid of the inventive ignition system and without a large expenditure in circuitry.

Accordingly, an object is to provide new and improved ignition systems. In this connection, an object is to provide the best system available from the latest semiconductor devices. The inventive system comprises a primary circuit including an ignition coil, an ignition condenser, and an electronic switch, such as a thyristor. The thyristor is fired through a suitable network, in series with the primary winding of an ignition coil. The secondary winding of the coil is connected with the spark plugs via an ignition distributor. According to the invention, the circuit arrangement is further characterized in that the condenser is charged by a pulse furnished through a pulse-generator circuit operated by a trigger pulse which occurs after each ignition. This mode of operation provides an advantage since the ignition energy is uniformly available at all times. Yet, the charging device only operates when it is necessary. It then operates with a very good degree of efficiency. Finally, in a circuit arrangement constructed according to the invention, it is possible to save many elements as compared with the conventional arrangements of this kind.

The above mentioned and other features of this invention and the manner of obtaining them will become more apparent, and the invention itself will be best understood by reference to the following description of an embodiment of the invention taken in conjunction with the accompanying drawing, in which the single sheet of drawings shows an ignition system constructed according to the teachings of the invention.

As shown in the accompanying drawing, the primary ignition circuit consists of a series circuit including a primary winding $W_1$ in an ignition coil Z, an ignition condenser $K_1$ and the thyristor G. The spark plugs (not shown) are connected through a distributor to the secondary winding $W_2$. The thyristor G is fired in a known way when the ignition interrupter contact S opens. The firing circuit consists of the resistors $R_1$, $R_2$, the condenser $K_2$, and the diode $D_1$.

According to the invention, a pulse generator circuit is arranged to charge the ignition condenser $K_1$ by pulses. This generator comprises a charging transformer L with an operating winding $W_3$, a feed-back winding $W_4$, a free-wheel winding $W_5$, and a transistor T. In the control circuit of the transistor T is the feed-back winding $W_4$, a resistor $R_3$ which limits the control current, and the diode $D_2$ which prevents the voltage from exceeding the breakdown voltage of the base-emitter diode of the transistor T. The aforementioned free-wheel winding $W_5$ is connected via the diode $D_3$ to a plate of the ignition condenser $K_1$.

An RC element $R_4$, $K_3$ is connected in parallel with the collector-emitter path of transistor T. This RC circuit serves as an auxiliary starting means as well as attenuating undesired high-frequency oscillations.

After the supply voltage U is applied, a charging current flows into the condenser $K_3$ via the operating winding $W_3$. A feed-back voltage is produced for rendering the transistor T conductive. A magnetizing current flows through the operating winding $W_3$, the current increase being nearly linear until the magnetic saturation of the charging transformer core is reached. Then the feed-back voltage breaks down and the transistor T is switched off. The energy stored in the magnetic field is then transmitted to the condenser $K_1$ in a current surge passing through the winding $W_5$ and the diode $D_3$. The ignition system is then ready to apply a firing voltage to the spark plug by firing the thyristor G.

After the firing of the thyristor G, the ignition condenser is discharged. The condenser $K_1$ together with the winding $W_1$ forms an oscillating circuit so that the polarity of the voltage is inverted at the condenser $K_1$. At the zero voltage cross-over of the current, the thyristor quenches, and a negative voltage spike occurs at the thyristor. This voltage spike reaches the charging transformer L via the diode $D_3$, thereby initiating the next following pulse generated by the pulse-generator circuit. This pulse starts an increasing magnetizing current flow through the winding $W_3$. During the period of this current flow, the pulse generator is disconnected from the ignition condenser $K_1$ through the isolation of the diode $D_3$. This leaves a sufficient time period to insure the turning off of the thyristor G.

Also, according to the invention, the ignition condenser $K_1$ is re-charged after each discharge into a spark plug. The first capacitor charging is initiated by the RC-element $R_4$, $K_3$. However, without any additional switching measures, it might be that after starting the electrical ignition process responsive to the first charging of the ignition condenser, the starter of the motor is not actuated immediately. If there is an extended interval between switching on of the ignition system and actuating the starter, the ignition condenser $K_1$ might be discharged via the insulating resistors and the reverse current of the thyristor. That would prevent an ignition when the starter is actuated.

To prevent this disadvantage, an auxiliary starting circuit is provided in the form of another condenser $K_4$ and a blockable diode gate consisting of the resistors $R_5$, $R_6$ and of the diode $D_4$ is included in the system.

This circuit provides an auxiliary starting means which operates in the following manner. When closing, the breaker contact S delivers a negative pulse via the condenser $K_4$ in order to start the pulse generator and, consequently, to produce a charging pulse. The blockable diode gate $D_4$ is provided to prevent such a charging pulse from being produced between two ignition cycles when the breaker contact S opens. Thus, the negative pulse reaches the collector of the transistor T only when the voltage at the ignition condenser $K_1$ has dropped below a defined value. The magnitude of this minimum value can be determined by the voltage divider $R_5$–$R_6$. If the voltage at this voltage divider point is twice as high as the supply voltage U, no pulse is transmitted because the diode $D_4$ remains blocked. If the voltage at the ignition condenser $K_1$ is too low, the voltage at the divider point is lower than the supply voltage. The diode $D_4$ is then poled in the direction of the current flow and the negative starting pulse can reach the collector of the transistor.

While the principles of the invention have been described above in connection with specific apparatus and applications, it is to be understood that this description is made only by way of example and not as a limitation of the scope of the invention.

We claim:

1. A condenser ignition device for internal combustion engines and the like including a pulse generator supplying pulse energy for charging an ignition condenser, a firing circuit, a primary ignition circuit including an electronic switch responsive to signals from the firing circuit for discharging the ignition condenser into an ignition coil, and a circuit to regulate the operation of the pulse generator, wherein the improvement comprises:

a pulse generator, powered by a battery potential, and connected to supply a changing potential to an ignition condenser, said pulse generator including a transistor, and a charging transformer having an operating winding, a feedback winding coupled to the control circuit of the transistor, and a free-wheel winding, a firing circuit responsive to interruption of an ignition interruptor contact to fire an electronic switch, said electronic switch, on firing, connecting the ignition condenser in series with the primary winding of an ignition coil to permit discharge of the condenser into said coil, said firing circuit constituting a network including a capacitor, a diode and resistors, and means coupling said network directly to the primary winding of the ignition coil, to the electronic switch, to the ignition condenser, and through auxiliary means to control the pulse generator in response to opening of an ignition interruptor contact.

2. A condenser ignition device as claimed in claim 1, in which, in the pulse generator circuit for producing a charging pulse:

the collector of said transistor is connected via the operating winding of the charging transformer to one pole of a DC supply voltage source and the emitter is connected to the other pole of said DC supply voltage source, a series circuit is provided, including a feed-back winding of the charging transformer, a limiter resistor, and a protective diode, said series circuit is connected between the base and emitter of the transistor, and a free-wheel winding of the charging transformer is connected in series with a diode as a path for the charging current of the ignition condenser as well as a path for the trigger pulse of the charging circuit in the reverse direction.

3. A condenser ignition device as claimed in claim 1, in which said auxiliary means to control the pulse generator is an auxiliary starting circuit in the form of a condenser and a blockable diode gate connected between the ignition interruptor contact and the collector of the transistor.

4. A condenser ignition device as claimed in claim 1, in which additional auxiliary means are provided to control the pulse generator, said additional auxiliary means including an RC circuit connected in parallel with the collector-emitter path of the transistor.

References Cited

UNITED STATES PATENTS

| | | | |
|---|---|---|---|
| 3,302,629 | 2/1967 | Shano | 123—148 |
| 3,312,860 | 4/1967 | Sturm | 315—223 |
| 3,318,296 | 5/1967 | Hufton | 123—148 |

LAURENCE M. GOODRIDGE, Primary Examiner

U.S. Cl. X.R.

315—209